(12) United States Patent
Savard et al.

(10) Patent No.: US 10,343,720 B2
(45) Date of Patent: Jul. 9, 2019

(54) SLEEVE FOR A VEHICLE ACCESSORY CONNECTOR, AND A VEHICLE ACCESSORY MOUNTING KIT

(71) Applicant: BOMBARDIER RECREATIONAL PRODUCTS INC., Valcourt (CA)

(72) Inventors: Laurent Savard, Granby (CA); Patrick Mathieu, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 7 days.

(21) Appl. No.: 15/708,899

(22) Filed: Sep. 19, 2017

(65) Prior Publication Data

US 2019/0009823 A1  Jan. 10, 2019

Related U.S. Application Data

(60) Provisional application No. 62/530,544, filed on Jul. 10, 2017.

(51) Int. Cl.
*B60J 9/00* (2006.01)
*B62D 21/18* (2006.01)

(52) U.S. Cl.
CPC .................. *B62D 21/183* (2013.01)

(58) Field of Classification Search
CPC ... E21B 2034/002; E21B 34/02; B01D 27/02; F16K 5/06; H01L 2924/0002; B60H 1/00557; B60H 1/2215; B60H 1/2225; B60S 1/488; C25D 11/04

USPC .................................................. 296/1.07, 29
See application file for complete search history.

(56) References Cited

U.S. PATENT DOCUMENTS

| | | | | |
|---|---|---|---|---|
| 3,741,249 A * | 6/1973 | Leutwyler | ............. | E21B 34/101 137/629 |
| 3,788,677 A * | 1/1974 | Stade | ...................... | F16L 23/08 285/367 |
| 3,964,773 A * | 6/1976 | Stade | .................. | F01N 13/1805 285/367 |
| RE28,912 E * | 7/1976 | Stade | ...................... | F16L 23/08 285/367 |
| 4,722,561 A * | 2/1988 | Heckethorn | ............ | F16L 23/08 24/279 |
| 4,941,690 A * | 7/1990 | Bodine, Sr. | .............. | F16L 13/16 285/38 |
| 5,399,046 A * | 3/1995 | Stielau | ................... | B62D 25/00 403/13 |
| 5,540,465 A * | 7/1996 | Sisk | ........................ | F16L 17/04 285/112 |
| 5,620,209 A * | 4/1997 | Sauer | ...................... | F16L 33/03 24/20 R |
| 6,343,407 B1 * | 2/2002 | Muto | ...................... | F16L 33/03 24/20 CW |

(Continued)

*Primary Examiner* — Kiran B Patel
(74) *Attorney, Agent, or Firm* — BCF LLP

(57) ABSTRACT

A sleeve for a vehicle accessory connector for mounting a vehicle accessory to a tubular frame of a vehicle which comprises a tubular body having a first open end, a second open end and a body thickness, the body thickness being circumferentially eccentric, the tubular body comprising two connectable portions; and an open ended slot defined in the tubular body, the open ended slot extending from the first open end towards the second open end and being spaced from the second open end.

9 Claims, 12 Drawing Sheets

(56) References Cited

U.S. PATENT DOCUMENTS

| | | | | |
|---|---|---|---|---|
| 6,386,786 | B1* | 5/2002 | Perlman | F16B 7/04 |
| | | | | 248/540 |
| 6,595,473 | B2* | 7/2003 | Aoki | F16L 3/10 |
| | | | | 138/108 |
| 6,968,864 | B2* | 11/2005 | Miyamoto | B60R 16/0215 |
| | | | | 138/108 |
| 7,007,900 | B2* | 3/2006 | Goodwin | H02G 7/053 |
| | | | | 248/68.1 |
| 7,581,564 | B2* | 9/2009 | Tanaka | F16L 21/06 |
| | | | | 138/110 |
| 8,944,474 | B2* | 2/2015 | Serizawa | F16L 3/1091 |
| | | | | 285/373 |
| 9,651,185 | B2* | 5/2017 | Borgmeier | F16L 25/01 |
| 10,006,479 | B2* | 6/2018 | Dickinson | B29C 45/006 |
| 10,012,336 | B2* | 7/2018 | Hackel | F01N 3/2066 |
| 10,047,895 | B2* | 8/2018 | Okada | F16L 57/005 |
| 10,090,607 | B2* | 10/2018 | Lindkamp | H01R 4/20 |
| 2010/0181746 | A1* | 7/2010 | Rose | B60R 21/2171 |
| | | | | 280/736 |
| 2010/0253067 | A1* | 10/2010 | Isenburg | F16L 53/38 |
| | | | | 285/41 |
| 2015/0204473 | A1* | 7/2015 | Svetlik | F16L 17/067 |
| | | | | 285/367 |
| 2015/0362099 | A1* | 12/2015 | Aramaki | F16L 19/0231 |
| | | | | 285/390 |
| 2018/0259103 | A1* | 9/2018 | Ignaczak | F16L 41/008 |

\* cited by examiner

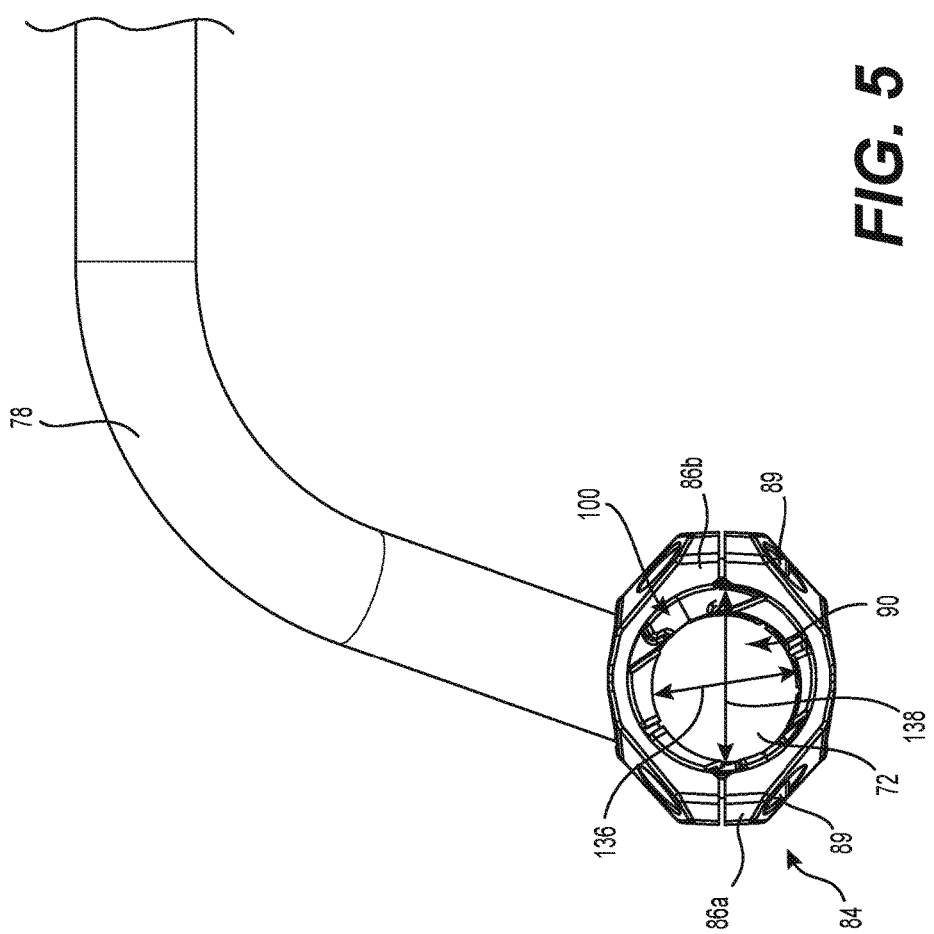

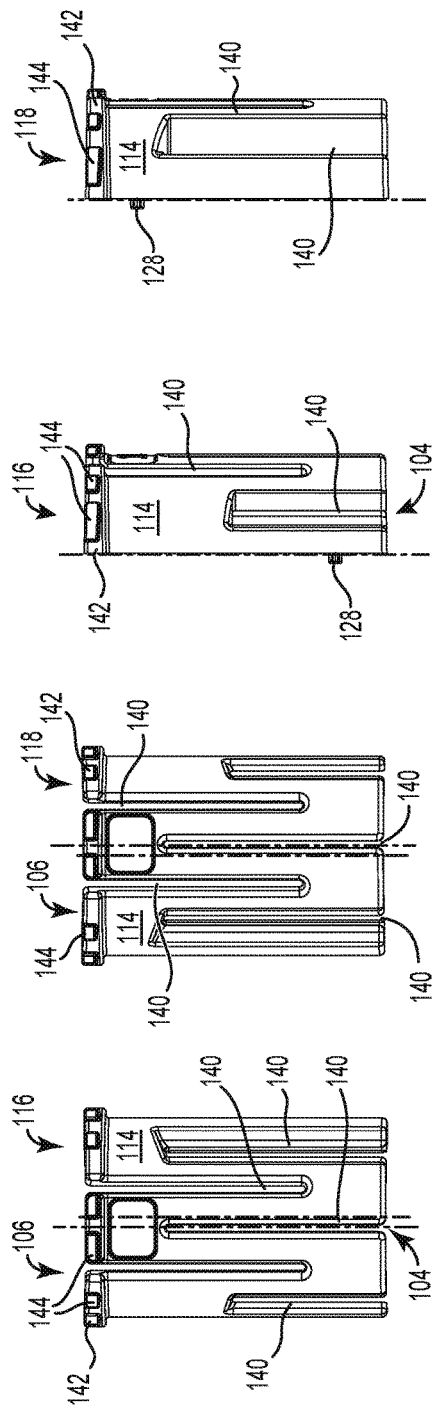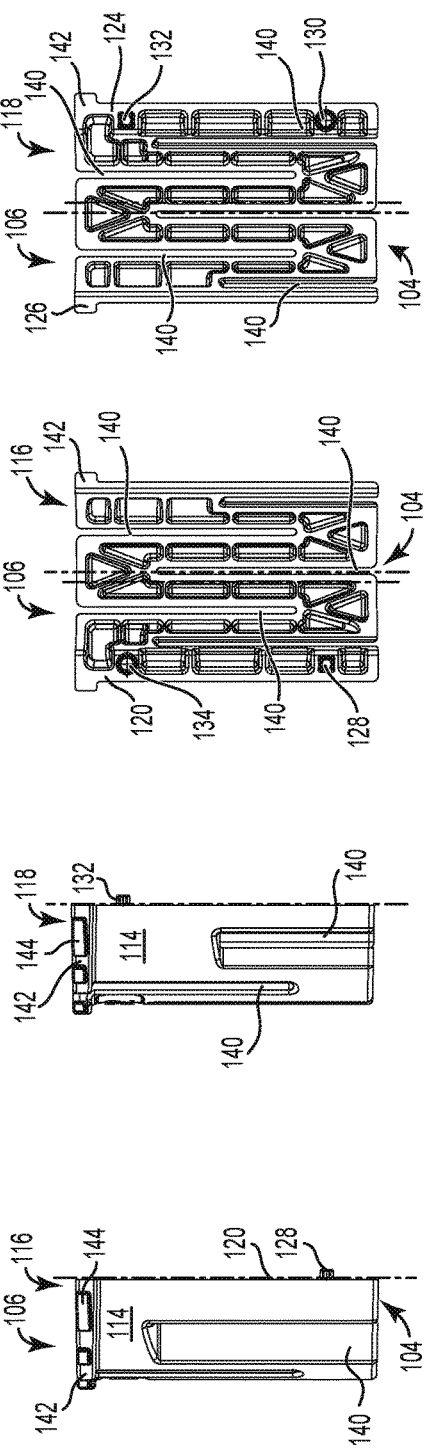

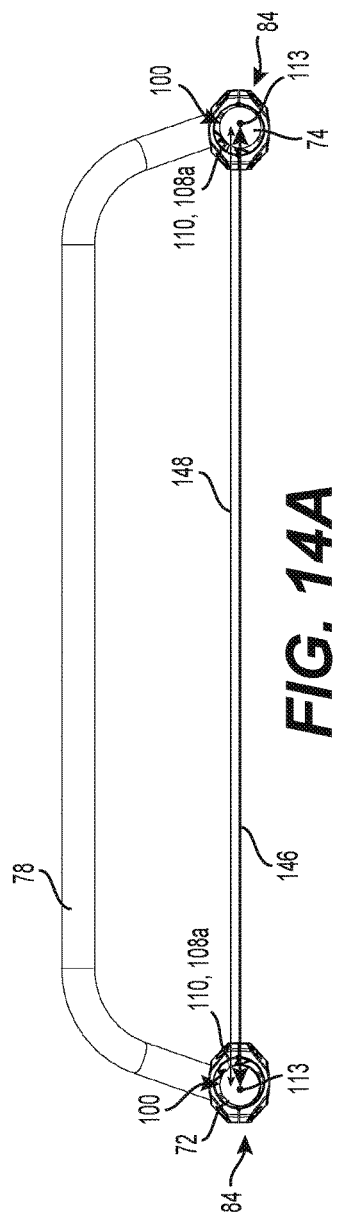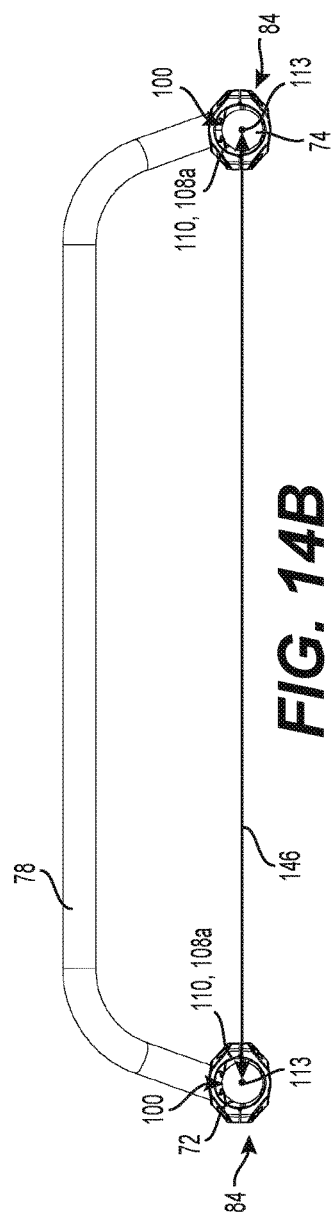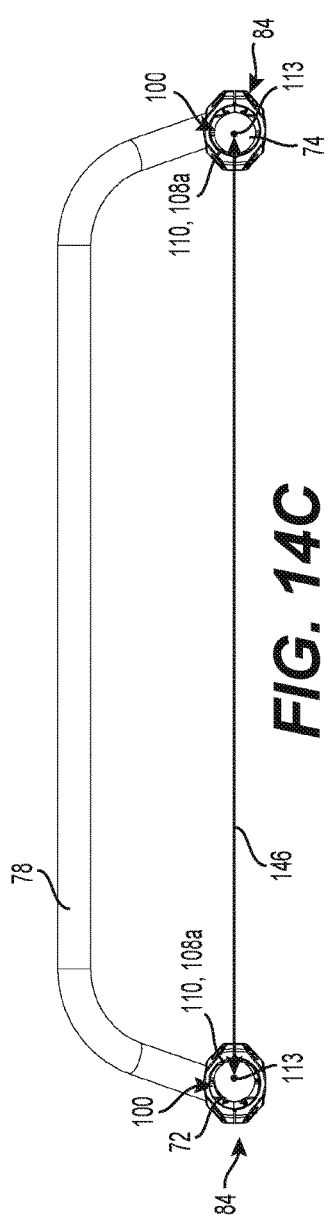

SLEEVE FOR A VEHICLE ACCESSORY CONNECTOR, AND A VEHICLE ACCESSORY MOUNTING KIT

CROSS-REFERENCE

The present application claims priority to U.S. Provisional Patent Application No. 62/530,544, filed Jul. 10, 2017, the entirety of which is incorporated herein by reference.

TECHNICAL FIELD

The present disclosure relates generally to a sleeve for a vehicle accessory connector, and a vehicle accessory mounting kit, specifically, but not exclusively, for mounting a vehicle accessory to a tubular frame of a vehicle.

BACKGROUND

Side-by-side vehicles (SSVs) are four-wheeled vehicles designed for off-road use. They have a driver seat and passenger seat(s) disposed side-by-side inside a passenger area defined in part by a roll cage. Some SSVs have accessories, such as racks and cargo boxes, which can be attached to the roll cage of the SSV.

Some accessories can be fixed to the roll cage by mounting a cross-bar across two lateral side bars of the roll cage using connectors, such as clamps, and attaching the accessory to the cross-bar.

However, the distance between the two lateral side bars of the roll cage may vary between SSVs due to manufacturing tolerances and to distortions introduced during the fabrication of the roll cage, such as warping of one or more of the two lateral side bars, and also due to variations from one accessory to another. Therefore, for cross-bars and connectors with fixed configurations, the cross-bar and the accessory may fit well on one vehicle but less well on another vehicle due to distance variations between the two lateral side bars of the roll cage, or accessory variations.

There is therefore a need for a vehicle accessory connector that alleviates at least some of the abovenoted drawbacks.

SUMMARY

It is an object of the present invention to ameliorate at least some of the inconveniences present in the prior art.

Broadly, there is provided a sleeve for a vehicle accessory connector, a sleeve and clamp assembly, and a vehicle accessory mounting kit, for mounting a vehicle accessory to a tubular frame of a vehicle, and which can account for variable distances between lateral side bars of a vehicle. The sleeve is arranged to be disposed between the tubular frame and the vehicle accessory connector, and has a configuration allowing it to be rotated about the tubular frame and to take up any slack between the tubular frame and the vehicle accessory connector.

From one aspect, there is provided a sleeve for a vehicle accessory connector for mounting a vehicle accessory to a tubular frame of a vehicle, the sleeve comprising: a tubular body having a first open end, a second open end and a body thickness, the body thickness being circumferentially eccentric, the tubular body comprising two connectable portions; and an open ended slot defined in the tubular body, the open ended slot extending from the first open end towards the second open end and being spaced from the second open end. The open ended slot may extend past a centre of the tubular body. The open ended slot may be substantially parallel to a cylindrical axis of the tubular body.

In certain implementations, the body thickness of the tubular body decreases circumferentially in a uniform manner between a maximum thickness and a minimum thickness, a portion of the tubular body with the maximum thickness being opposite another portion of the tubular body with the minimum thickness.

In certain implementations, the tubular body comprises two longitudinal portions which are connectable to form the tubular body. The two longitudinal portions may be two half portions. In certain embodiments, the two longitudinal portions comprise: abutting walls, and a sleeve connector acting between the abutting walls to connect the two longitudinal portions together. The sleeve connector may comprise a pin extending from one of the abutting walls and an opening sized and shaped to receive the pin in the other of the abutting walls.

In certain implementations, one of the first open end or the second open end comprises a lip. The lip may define at least one notch therein.

In certain implementations, the tubular body has an internal diameter sized and shaped to receive a tube of a tubular frame of a vehicle, and an external diameter sized and shaped to be received within the vehicle accessory connector. The tubular body may be made of a resilient material.

The open ended slot may comprise a plurality of open ended slots defined in the tubular body and circumferentially spaced apart from one another, at least one of the plurality of open ended slots extending from the first open end towards the second open end and being spaced from the second open end, and at least one of the plurality of open ended slots extending from the second open end towards the first open end and being spaced from the first open end, and at least two consecutive slots of the plurality of open ended slots alternately extend from the first open end and the second open end of the tubular body.

In certain implementations, the tubular body defines an inner cylindrical surface having an inner cylindrical axis, and an outer cylindrical surface having an outer cylindrical axis, the inner and outer cylindrical axes being off-set.

According to another aspect, there is provided a vehicle accessory mounting kit comprising: an accessory mounting member for mounting a vehicle accessory thereto; a vehicle accessory connector for connecting the accessory mounting member to a tubular frame of a vehicle; and a sleeve for insertion into a cylindrical passage defined in the vehicle accessory connector, the sleeve comprising: a tubular body having a first open end, a second open end and a body thickness, the body thickness being circumferentially eccentric, the tubular body comprising two connectable portions; and an open ended slot defined in the tubular body, the open ended slot extending from the first open end towards the second open end and being spaced from the second open end. The open ended slot may extend from the first open end past a centre of the tubular body. The open ended slot may be substantially parallel to a cylindrical axis of the tubular body.

In certain implementations, the body thickness of the tubular body of the sleeve decreases circumferentially in a uniform manner from a maximum thickness to a minimum thickness, a portion of the tubular body with the maximum thickness being opposite another portion of the tubular body with the minimum thickness.

In certain implementations, the tubular body of the sleeve comprises two longitudinal portions which are connectable to form the tubular body. The two longitudinal portions may be two half portions. In certain implementations, the longitudinal portions comprise abutting walls, and a sleeve connector acting between the abutting walls to connect the two longitudinal portions together. The sleeve connector may comprise a pin extending from one of the abutting walls and an opening sized and shaped to receive the pin in the other of the abutting walls.

In certain implementations, one of the first open end or the second open end of the sleeve tubular body comprises a lip. The lip may define at least one notch formed therein.

In certain implementations, the open ended slot comprises a plurality of open ended slots defined in the tubular body and circumferentially spaced apart from one another, at least one of the plurality of open ended slots extending from the first open end towards the second open end and being spaced from the second open end, and at least one of the plurality of open ended slots extending from the second open end towards the first open end and being spaced from the first open end. At least two consecutive slots of the plurality of open ended slots may extend alternately from the first open end and the second open end of the tubular body. The tubular body may be made of a resilient material.

In certain implementations, the tubular body defines an inner cylindrical surface having an inner cylindrical axis, and an outer cylindrical surface having an outer cylindrical axis, the inner and outer cylindrical axes being off-set.

In certain implementations, the vehicle accessory connector is a clamp comprising a clamp body defining the internal passage for receiving the sleeve and two open ends for allowing the tube of the vehicle tubular frame to extend therethrough, the clamp body defining a recess in an external surface for receiving an end of the accessory mounting member. A circumferential groove may be provided on an internal surface of the clamp body at one of the open ends for receiving the lip of the sleeve in use. The clamp body may have two half portions which are connectable to form the clamp body. The two half portions may be connectable using a clamp connector such as screws.

In certain implementations, the sleeve comprises two sleeves, and the vehicle accessory connector comprises two vehicle accessory connectors. The two vehicle accessory connectors are arranged to connect to an end of a mounting member for mounting the vehicle accessory.

From a yet further aspect, there is provided a vehicle comprising: a frame; two front wheels operatively connected to the frame; two rear wheels operatively connected to the frame; at least one seat connected to the frame; a motor connected to the frame, the motor being operatively connected to at least one of: the two front wheels; and the two rear wheels; and a roll cage connected to the frame disposed above the seat, the roll cage comprising a tubular frame; a sleeve disposed around a tube of the tubular frame, the sleeve comprising a tubular body having a first open end, a second open end and a body thickness, the body thickness being circumferentially eccentric, the tubular body comprising two connectable portions; a vehicle accessory connector disposed around the sleeve; an accessory mounting member connected to the vehicle accessory connector; and an accessory connected to the accessory mounting member.

In certain implementations, the sleeve comprises an open ended slot defined in the tubular body, the open ended slot extending from the first open end towards the second open end and being spaced from the second open end.

In certain implementations, the body thickness of the tubular body decreases circumferentially in a uniform manner from a maximum thickness to a minimum thickness. A portion of the tubular body with the maximum thickness may be opposite a portion of the tubular body with the minimum thickness. The open ended slot may extend past a centre of the tubular body.

In certain implementations, the tubular body comprises two longitudinal portions which are connectable to form the tubular body. The two longitudinal portions may be two half portions. The two longitudinal portions may comprise: abutting walls, and a sleeve connector acting between the abutting walls to connect the two longitudinal portions together. The sleeve connector may comprise a pin extending from one of the abutting walls and an opening sized and shaped to receive the pin in the other of the abutting walls.

In certain implementations, one of the first open end or the second open end comprises a lip. The lip may define at least one notch therein.

In certain implementations, the tubular body has an internal diameter sized and shaped to extend around a tube of the tubular frame of the vehicle, and an external diameter sized and shaped to be received within the vehicle accessory connector. The open ended slot may comprise a plurality of open ended slots defined in the tubular body and circumferentially spaced apart from one another, at least one of the plurality of open ended slots extending from the first open end towards the second open end and being spaced from the second open end, and at least one of the plurality of open ended slots extending from the second open end towards the first open end and being spaced from the first open end. At least two consecutive slots of the plurality of open ended slots may extend alternately from the first open and the second open end of the tubular body.

In certain implementations, the open ended slot may be substantially parallel to a cylindrical axis of the tubular body.

In certain implementations, the open ended slot may be angled with respect to the cylindrical axis of the tubular body.

In certain implementations, the tubular body may define an inner cylindrical surface having an inner cylindrical axis, and an outer cylindrical surface having an outer cylindrical axis, the inner and outer cylindrical axes being off-set.

In certain implementations, the vehicle accessory connector is a clamp comprising a clamp body defining an internal passage for receiving the sleeve and two open ends for allowing a tube of the vehicle tubular frame to extend therethrough, the clamp body defining a recess in an external surface thereof for receiving an end of the accessory mounting member. A circumferential groove may be provided on an internal surface of the clamp body at one of the open ends for receiving the lip of the sleeve in use. The clamp body may have two half portions.

In certain implementations, the tube of the tubular frame is a first tube, the sleeve is a first sleeve and the vehicle accessory connector is a first vehicle accessory connector, the tubular frame comprises: a second tube spaced from the first tube, a second sleeve disposed around the second tube of the tubular frame, the second sleeve comprising a tubular body having a first open end, a second open end and a body thickness, the body thickness being circumferentially eccentric, the tubular body comprising two connectable portions; a second vehicle accessory connector disposed around the second sleeve; the accessory mounting member connected to the second vehicle accessory connector.

In certain implementations, the accessory mounting member has a first end connected to the first vehicle accessory connector, and a second end connected to the second vehicle accessory connector.

From another aspect, there is provided a sleeve and clamp assembly comprising: the sleeve according to any of the above implementations, and the vehicle accessory connector, the vehicle accessory connector being a clamp having a clamp body defining a cylindrical passage for receiving the sleeve and two open ends for allowing the tube of the vehicle tubular frame to extend therethrough, the clamp body defining a recess in an external surface thereof for receiving an end of an accessory mounting member attachable to the accessory.

In certain implementations, the sleeve and clamp assembly further comprises a circumferential groove on an internal surface of the clamp body at one of the open ends of the clamp body for receiving the lip of the sleeve in use. The clamp may comprise two half portions which are connectable to form the clamp body.

In certain implementations, the sleeve and clamp assembly further comprising the accessory mounting member, the accessory mounting member comprising an elongate metal tube.

By means of certain implementations of the present disclosure, the sleeve helps, at least in part, to compensate for differences in the roll cage tubular frame structures to which the mounting member will be attached. For example, the eccentricity of the sleeve tubular body allows the filling of any space between the vehicle connector and the roll cage tubular structure by orienting the sleeve about the tubular structure. This can ensure a more consistent mounting of vehicle attachments to roll cages despite manufacturing tolerances.

Implementations of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of implementations of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 5 is an end view of an end portion of the mounting member with the vehicle accessory connector and the sleeve of FIG. 1 connected thereto;

FIGS. 10A and 10B are front views showing the outside of the first longitudinal portion and the second longitudinal portion of FIGS. 8A and 8B, respectively;

FIGS. 11A and 11B are right side views of the first longitudinal portion and the second longitudinal portion of FIGS. 8A and 8B, respectively;

FIGS. 12A and 12B are left side views of the first longitudinal portion and the second longitudinal portion of FIGS. 8A and 8B, respectively;

FIGS. 13A and 13B are rear views of the first longitudinal portion and the second longitudinal portion of FIGS. 8A and 8B, respectively;

FIG. 14A is an end view of a left end portion and a right end portion of the mounting member of FIG. 1, each of the left end portion and the right end portion having the vehicle accessory connector and the sleeve of FIG. 1 connected thereto; and FIGS. 14B and 14C are the end views of FIG. 14A, with the sleeves rotated to different positions.

DETAILED DESCRIPTION

The present technology will be described herein with respect to side-by-side vehicles. It is contemplated that aspects of the present technology could also be applied to other types of vehicles having tubular frame structures, such as automobiles.

Figure 1:
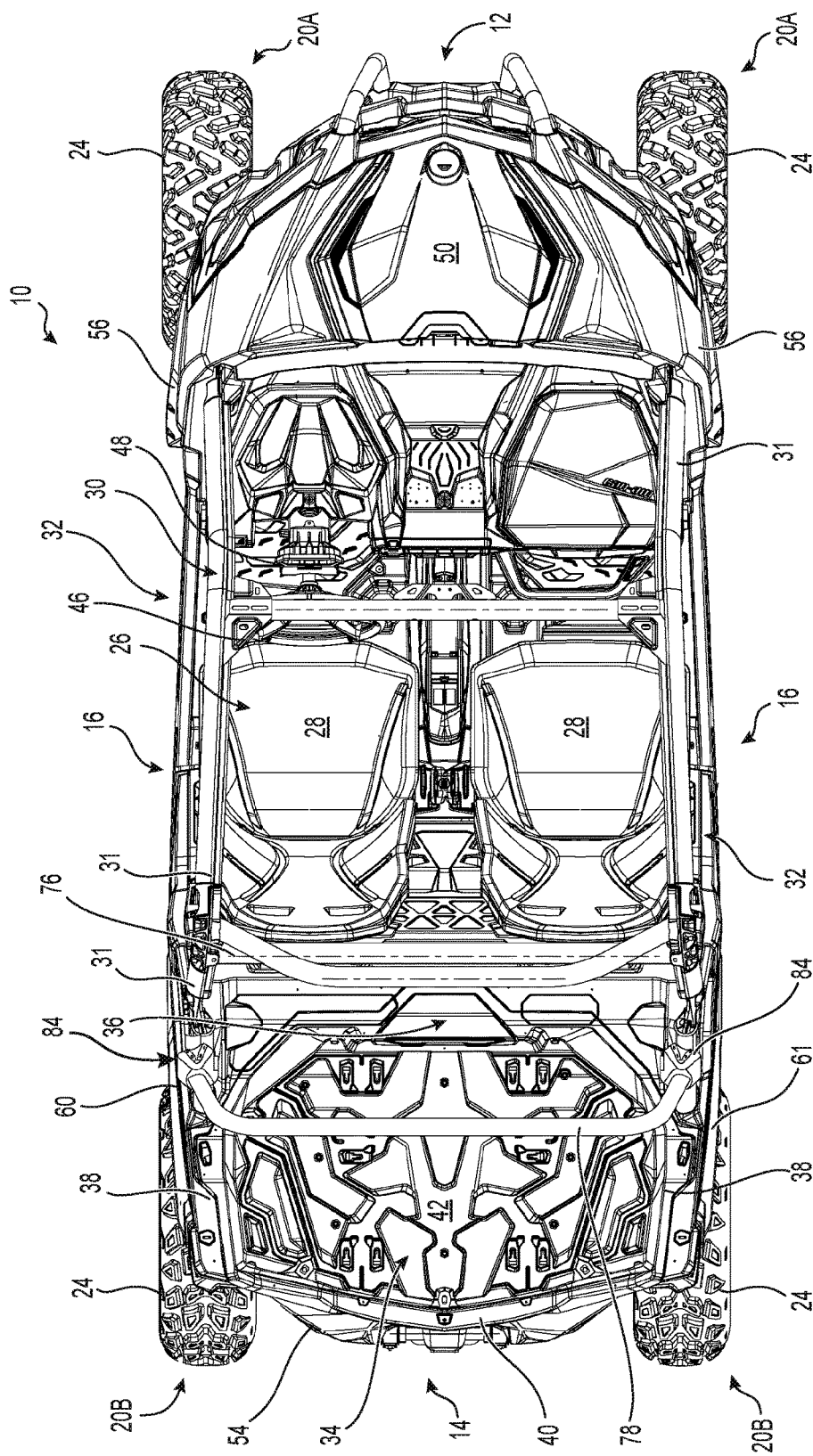
FIG. 1 is a top plan view of a side-by-side vehicle, including a roll cage with a mounting member, a pair of vehicle accessory connectors and a pair of sleeves connected thereto.
Figure 2:
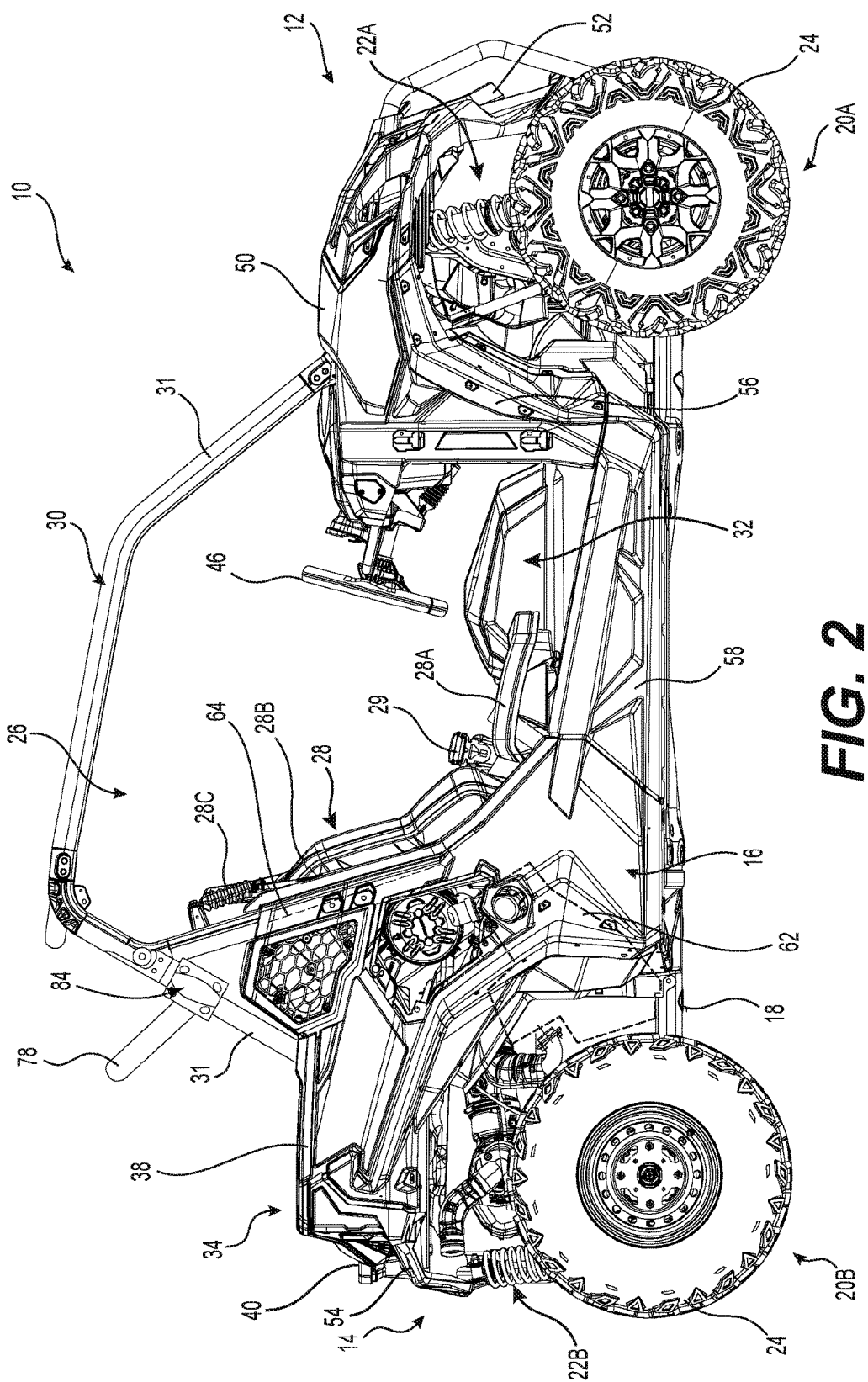
FIG. 2 is a right side elevation view of the vehicle of FIG. 1.

A side-by-side vehicle (SSV) 10 is illustrated in FIGS. 1 and 2. The SSV 10 has a front end 12, a rear end 14, and two lateral sides 16 (left and right). The SSV 10 includes a frame 18. A pair of front wheels 20A is suspended from the front portion of the frame 18 via front suspension assemblies 22A. A pair of rear wheels 20B is suspended from the rear portion of the frame 18 via rear suspension assemblies 22B. Each of the four wheels 20A, 20B has a tire 24. A cockpit area 26 is disposed in the middle portion of the frame 18. Left and right seats 28 are connected to the middle portion of the frame 18. As can be seen in FIG. 1, the seats 28 are disposed side-by-side in the cockpit area 26. Each seat 28 is a bucket seat having a seat base 28A and a backrest 28B. Each backrest 28B incorporates a headrest 28C. It is contemplated that the seats 28 could be other types of recumbent seats. Each seat 28 is also provided with a seat belt 29.

A roll cage 30 is connected to the frame 18 and is disposed above the cockpit area 26, and covers at least in part the cockpit area 26. The roll cage 30 is an arrangement of tubes 31 that contribute to protecting the riders, and will be described in further detail below. The roll cage 30 has several attachment points to the frame 18. The cockpit area 26 forms two lateral passages 32 (left and right) on the two lateral sides 16 of the SSV 10. The two lateral passages 32 can be selectively partially closed by two doors (not shown).

A cargo box 34 is mounted to the frame 18 rearward of the seats 28. It is contemplated that the cargo box 34 could be replaced by a cargo rack. In the present implementation, the cargo box 34 is fixed to the frame 18, but it is also contemplated that the cargo box 34 could be pivotally mounted to the frame 18. It is contemplated that in some implementations, the cargo box 34 could be omitted. The cargo box 34 has a front wall 36, two side walls 38, a rear wall 40 and a floor 42. As seen in FIG. 2, the rear wall 40 is lower than the side walls 38, thus facilitating access to the cargo space defined by the cargo box 34.

A steering device including a steering wheel 46 is disposed in front of the left seat 28. It is contemplated that the steering wheel 46 could be disposed in front of the right seat 28. The steering device is operatively connected to the two front wheels 20A to permit steering of the SSV 10. A display cluster 48 is disposed in front of the steering wheel 46. A throttle operator in the form of a throttle pedal (not shown) is disposed over the floor of the cockpit area 26 below the steering wheel 46 and in front of the left seat 28.

The SSV 10 has a vehicle body mounted to the frame 18. The vehicle body includes a hood 50, a front body panel 52, a rear body panel 54 and a number of side body panels. The side body panels include front right and left fenders 56, lower central right and left panels 58, a rear left fender 60 and a rear right fender 61. It is contemplated that the hood 50, the front body panel 52, the rear body panel 54, the fenders 56, 60, 61, and the lower central panels 58 could each be replaced by multiple panels. It is also contemplated that the vehicle body of the SSV 10 could have more or less body panels than described above.

The SSV 10 is powered by a motor, specifically an internal combustion engine 62, which is shown schematically in FIG. 2. The engine 62 is disposed rearward of the seat bases 28A below the cargo box 34. Shown schematically in FIG. 2, a firewall 64 is disposed between the seats 28 and the engine 62. It is contemplated that the engine 62 could be replaced by a hybrid or electric motor in some implementations. The engine 62 is operatively connected to the wheels 20A, 20B to drive the wheels 20A, 20B in order to drive the SSV 10. It is also contemplated that only two of the four wheels 20A, 20B could be driven by the engine 62.

Figure 3:
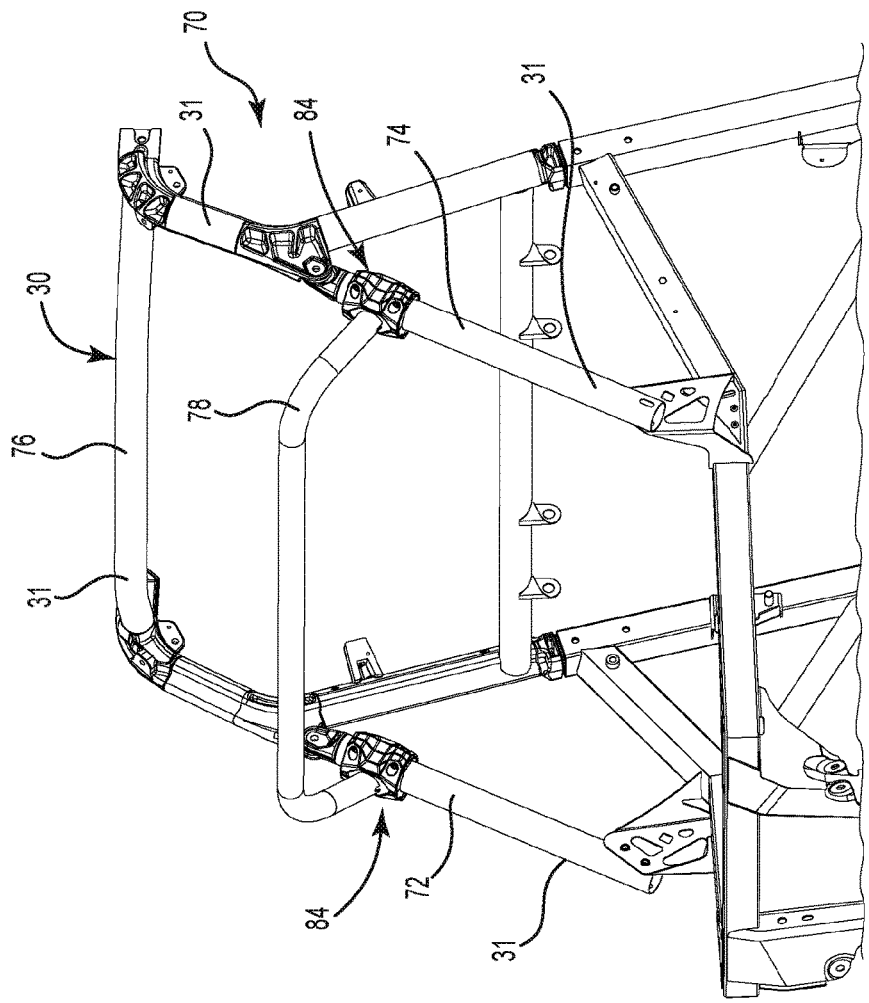
FIG. 3 is a close-up rear, right side perspective view of a rearward portion of the roll cage, the mounting member, the connectors and the sleeves of FIG. 1.
Figure 4:
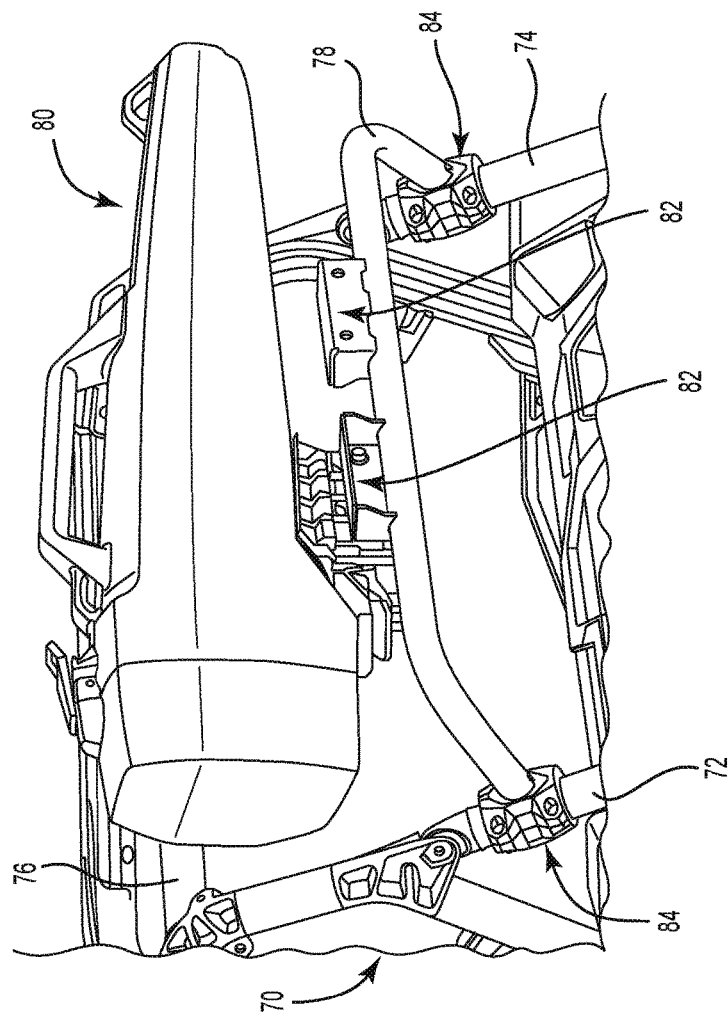
FIG. 4 is a close-up rear, left side perspective view of a rearward portion of the roll cage, the mounting member, the connectors and the sleeves of FIG. 1, and including an accessory.

Turning now to FIGS. 3 and 4, in which a rearward portion 70 of the roll cage 30 is illustrated. The rearward portion 70 of the roll cage 30 comprises, at least in part, a tubular frame comprising the interconnected tubes 31, and including a left lateral side bar 72 and a right lateral side bar 74, both made of metal. The left lateral side bar 72 extends downwardly and rearwardly from a left end of a top bar 76. The right lateral side rail 74 extends downwardly and rearwardly from a right end of the top bar 76.

An accessory mounting member 78 is provided for mounting a vehicle accessory 80(FIG. 4) to the roll cage 30 using accessory mounting brackets 82. The accessory mounting member 78 is a cross-bar 78. The cross-bar 78 is a metal tube comprising an elongate body having two ends. The elongate body has a straight central portion and two end portions which are angled with respect to the central portion such that the cross-bar 78 has a U-shaped configuration. The cross-bar 78, when connected to the roll cage 30, extends between the left lateral side bar 72 and the right lateral side bar 74, and is connected thereto by a vehicle accessory connector 84 at each end of the cross-bar 78. The vehicle accessory 80 is a container for storage of firearms. In other implementations, the vehicle accessory 80 is any other type of container, rack, frame, or other type of accessory for attachment to the roll cage 30. In other implementations, the cross-bar 78 has another configuration such as a V-shaped configuration.

The vehicle accessory connector 84 will now be described with particular reference to FIGS. 5 and 6A. As stated above, the vehicle accessory connector 84 is provided at each end of the cross-bar 78. The vehicle accessory connector 84 connects the cross-bar 78 to the left lateral side bar 72 and the right lateral side bar 74. For ease of description only, the attachment of the vehicle accessory connector 84 to the left lateral side bar 72 will be described. However, the description below can also apply to the attachment of the vehicle accessory connector 84 to the right lateral side bar 74. In other implementations, the cross-bar 78 is attached at one end with the vehicle accessory connector 84, and by other means at the other end of the cross-bar 78.

The vehicle accessory connector 84 is a clamp 84 having a clamp body 86 with two open ends 88. The clamp body 86 has two half portions 86a, 86b which are connectable together, using screws 89, to define a cylindrical passage 90. The cylindrical passage 90 and the two open ends are sized to encircle the left lateral side bar 72, such that the left lateral side bar 72 can extend through the vehicle accessory connector 84. An external surface 92 of the portion 86b of the clamp body 86 defines a recess 94 for receiving one of the ends of the cross-bar 78 and attaching thereto by welding. In other implementations, the cross-bar 78 end is connected to the portion 86b of the clamp body 86 in any other way, such as by chemical adhesive, screw fit, or the like. An internal surface 96 of the clamp body 86 has a circumferential groove 98 at one of the open ends. In the present implementation, the groove 98 is at the lower open end.

Referring now to FIGS. 5 to 12, a sleeve 100 is provided for interposition between the vehicle accessory connector 84 and the left lateral side bar 72. The sleeve 100 is arranged to accommodate for variations in distance between the left lateral side bar 72 and the right lateral side bar 74 due to manufacturing tolerances and to distortions introduced during the fabrication of the roll cage 30, to the cross-bar 84, or for any other reason.

Figure 7:
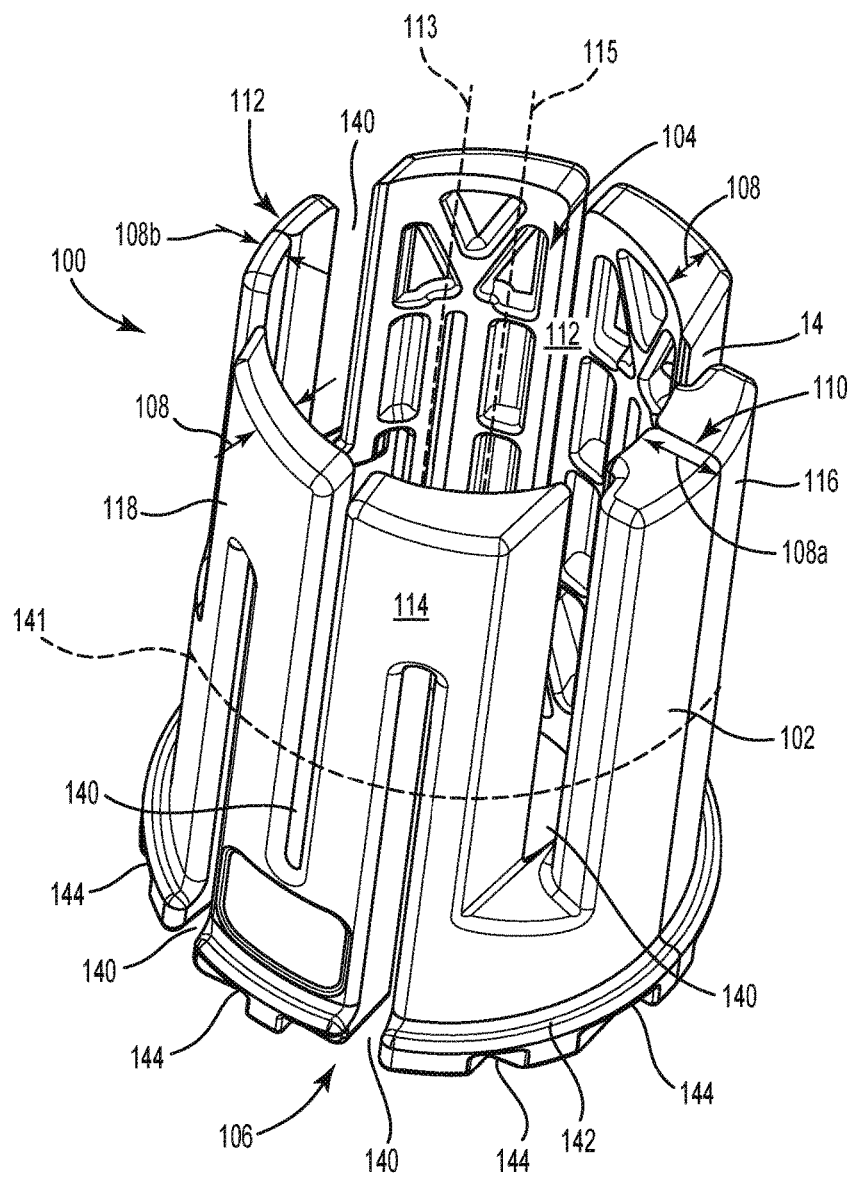
FIG. 7 is a perspective view of the sleeve of FIG. 6B.
Figure 8A:
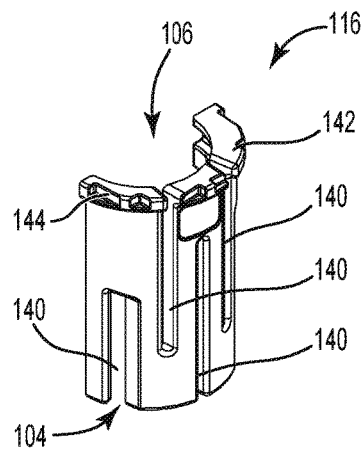
FIGS. 8A and 8B are perspective views of a first longitudinal portion and a second longitudinal portion, respectively, of the sleeve of FIG. 7.
Figure 8B:
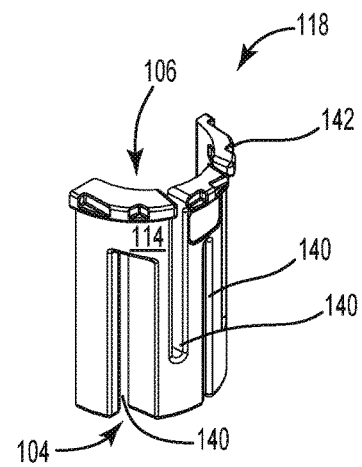
Figure 8C:
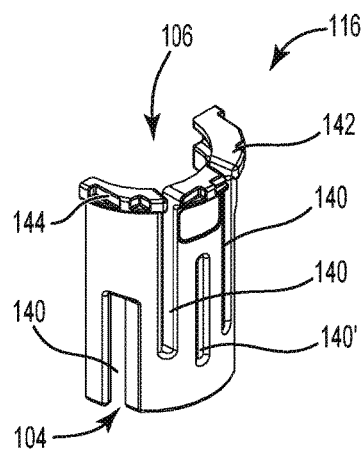
FIGS. 8C and 8D are perspective views of an alternative implementation of the first longitudinal portion and the second longitudinal portion of FIGS. 8A and 8B.
Figure 8D:
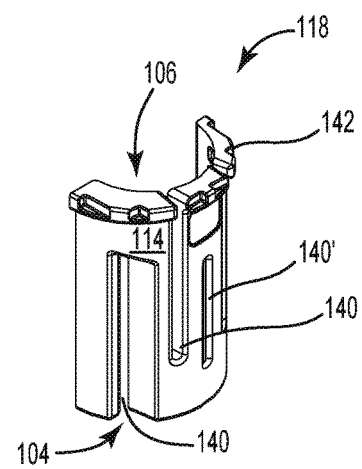
Figure 9A:
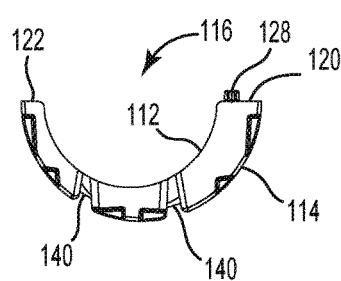
FIGS. 9A and 9B are top plan views of the first longitudinal portion and the second longitudinal portion of FIGS. 8A and 8B, respectively, when viewed from one open end.
Figure 9B:
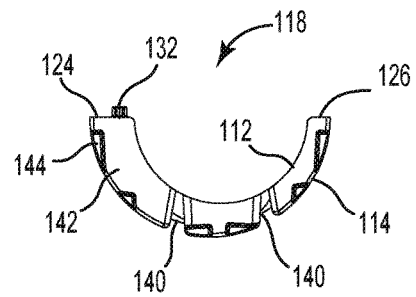

The sleeve 100 comprises a tubular body 102 having two open ends 104, 106 and a body thickness 108 which is circumferentially eccentric. The two open ends 104, 106 are said to be first open end 104 and a second open end 106. As seen in FIG. 7, the body thickness 108 of the tubular body 102 decreases circumferentially in a uniform manner between a maximum thickness 108a and a minimum thickness 108b. A portion 110 of the tubular body 102 with the maximum thickness is opposite another portion 112 of the tubular body 102 with the minimum thickness. The tubular body 102 defines an inner cylindrical surface 112 having an inner cylindrical axis 113, and an outer cylindrical surface 114 having an outer cylindrical axis 115, the inner and outer cylindrical axes 113, 115 being off-set from one another.

With reference to FIGS. 8A to 13B, the tubular body 102 comprises first and second longitudinal portions 116, 118 which are connectable to form the tubular body 102. As such, the first and second longitudinal portions are said to be two connectable portions 116, 118. Each one of the longitudinal portions 116, 118 is a half portion and resembles a half pipe. The first longitudinal portion 116 has a first wall 120 and a second wall 122, which respectively abut a first wall 124 and a second wall 126 of the second longitudinal portion 118. The first wall 120 of the first longitudinal portion 116 abuts the first wall 124 of the second longitudinal portion 118, and the second wall 122 of the first longitudinal portion 116 abuts the second wall 126 of the second longitudinal half portion 118. A sleeve connector in the form of a first pin 128 extends from the first wall 120 of the firstlongitudinal portion 116 at the end 104 and is sized and shaped for insertion in a first opening 130 formed in the first wall 124 of the second longitudinal portion 118 at the end 104. A second pin 132 extends from the first wall 124 of the second longitudinal portion 118 at the end 106 and is sized and shaped for insertion in a second opening 134 formed in the first wall 120 of the first longitudinal portion 116 at the end 106. Engagement of the first and second pins 128, 132, with the first and second openings 130, 134, respectively, can thereby connect the first and second longitudinal portions 116, 118 together.

In other implementations, a single pin-and-opening type sleeve connector can be provided instead of two pin-and-opening type sleeve connectors. In other implementations, instead of the pin-opening type sleeve connector described above, other types of sleeve connectors can be provided to connect the first and second longitudinal portions 116, 118, for example clasps, hooks, clips or the like. In other implementations, one or more sleeve connectors of any type can also be provided between the second walls 122, 126 of the first and second longitudinal portions 116, 118, respectively.

The tubular body 102 has an internal diameter 136 sized and shaped to receive the left lateral side bar 72 of the roll cage 30, and an external diameter 138 sized and shaped to be received within the clamp 84 (FIG. 5). Specifically, the internal diameter 136 is at least the same as an outer diameter of the left lateral side bar 72, and the external diameter 138 is about the same as an inner diameter of the clamp 84. In other implementations, the internal diameter 136 is bigger than an outer diameter of the left lateral side bar 72. In other implementations, the external diameter 138 is bigger than an inner diameter of the clamp 84. In yet other implementations, the internal diameter 136 is smaller than an inner diameter of the clamp 84 which can facilitate manipulation of the tubular body 102.

Open ended slots 140 are defined in the tubular body 102 and are circumferentially spaced apart from one another. Each open ended slot 140 is substantially parallel to the inner cylindrical axis 113 and the outer cylindrical axis 115 of the tubular body 102.

Specifically, six open ended slots 140 extend from the open end 104 towards the open end 106, and are spaced from the open end 106. The first and second longitudinal portions each have three such slots 140. These slots 140 are open at the open end 104 of the tubular body. Four open ended slots 140 extend from the open end 106 towards the open end 104 and are spaced from the open end 104. These slots 140 are open at the open end 106 of the tubular body 102. The first and second longitudinal portions 116, 118 each have two such slots 140. Each open ended slot 140 extends past a centre 141 of the tubular body 102 (FIG. 7). In each of the first and second longitudinal portions 116, 118, consecutive open ended slots 140 alternately extend from the ends 104, 106. The tubular body 102 is made of aluminum. In other implementations, the tubular body 102 is made of any other material, such as a metal alloy, a metal composite, or a resilient material.

The alternately extending slots 140 and the aluminum, at least in part, contribute to an ability to vary the circumferential size and profile of the tubular body 102. For example, small modifications in the internal and external diameters 136, 138 of the tubular body 102 during use are possible. Also the slots 140 can provide flexibility to the tubular body 102 to better transfer the clamping load to the vehicle's lateral side bars 72, 74.

In other implementations, more or less than the number of illustrated and described open ended slots 140 can be provided.

In another implementation (FIGS. 8C and 8D), the first and second longitudinal portions 116, 118 also include closed-ended slots 140'. It will be appreciated that the combination of the open-ended slots 140 and the closed ended slots 140' may take any configuration on the first and second longitudinal portions 116, 118 other than the illustrated configuration.

A lip 142 is provided at the open end 106. Circumferentially spaced notches 144 are defined in the lip 142. The lip 142 is sized and shaped to be received in the circumferential groove 98 of the clamp 84 in use to position the sleeve 100 with respect to the clamp 84 and to limit its movement longitudinally, whilst allowing rotation of the sleeve 100 within the clamp 84. The notches 144 are configured to receive a tool (not shown) which could be used to rotate the sleeve 100 when the sleeve 100 is installed on the left lateral side bar 72, between the two half portions 86a and 86b of the clamp 84, and to provide better grip when turning the sleeve 100 by hand.

Figure 6A:
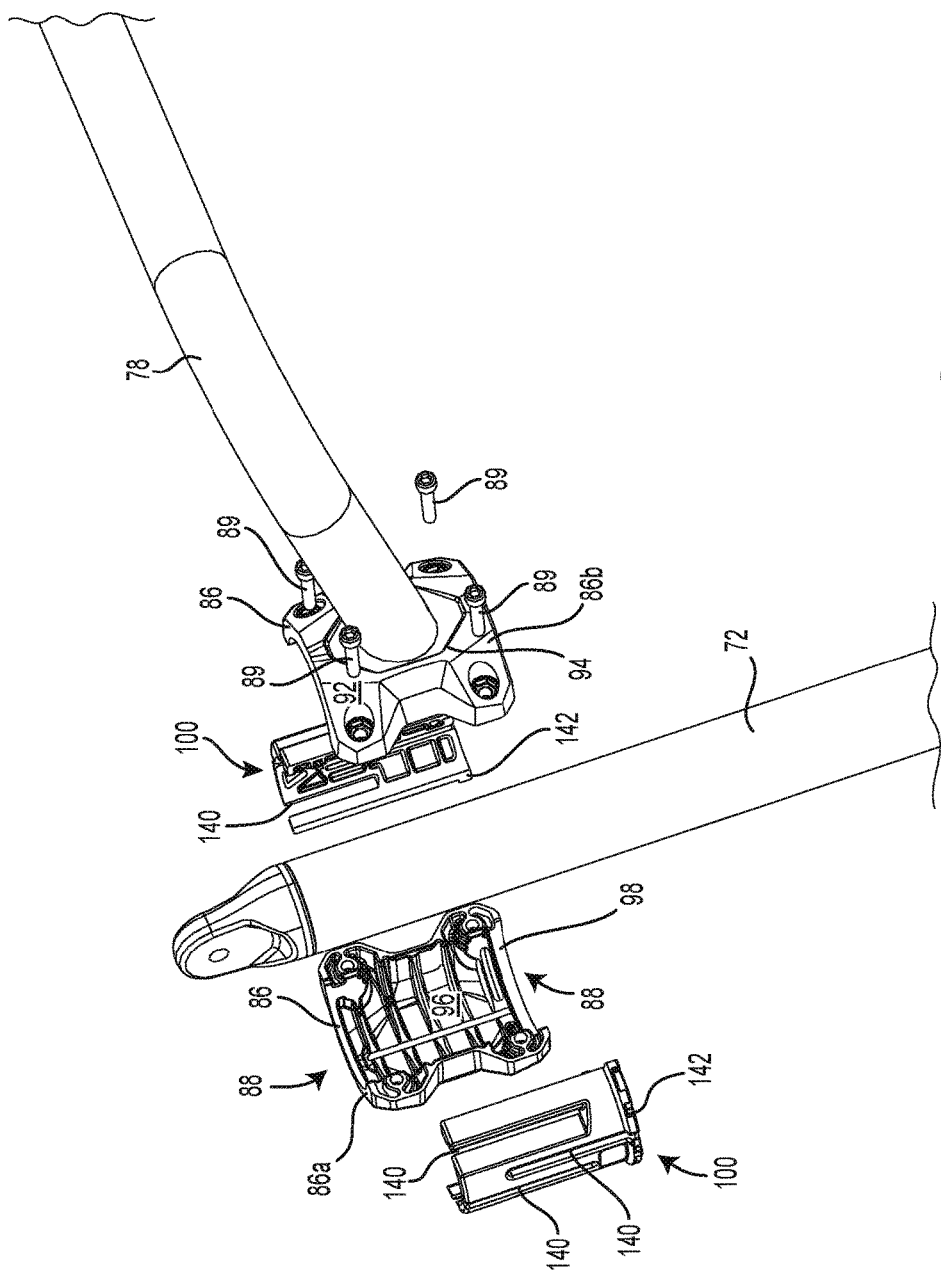
FIG. 6A is an exploded view of a tubular frame of the roll cage, the vehicle connector and the sleeve of FIG. 1.
Figure 6B:
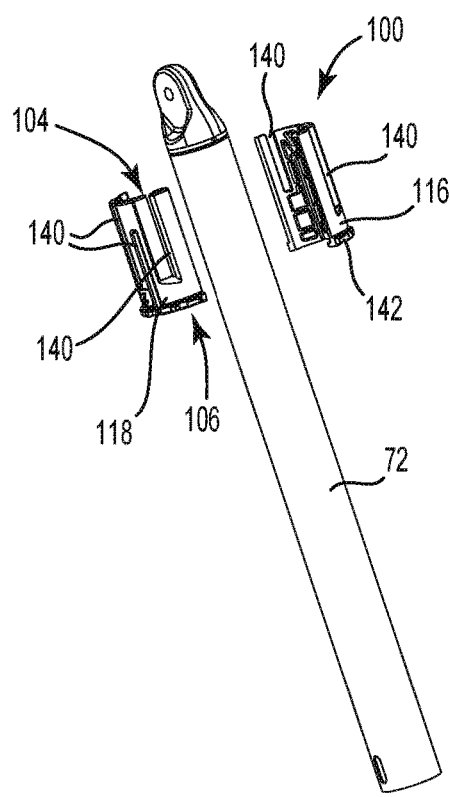
FIG. 6B is the exploded view of FIG. 6A, showing the tubular frame of the roll cage and the sleeve with the vehicle connector and the mounting member removed for clarity.
Figure 6C:
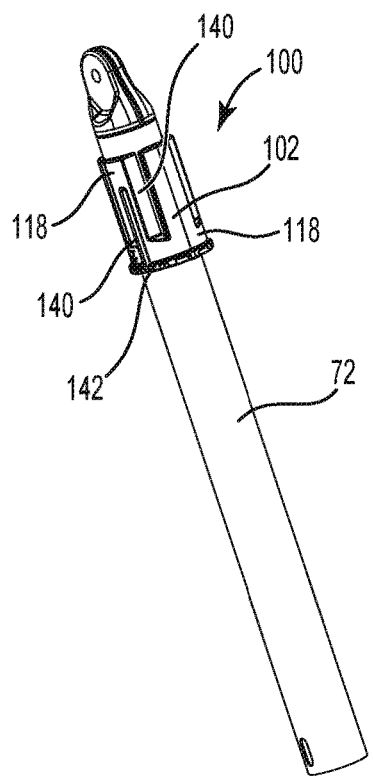
FIG. 6C is an assembled view of the exploded view of FIG. 6B, showing the sleeve attached to the tubular frame of the roll cage.

FIGS. 5 and 6A illustrate the sleeve 100 and clamp 84 assembly on the left lateral side bar 72. In use, one or a pair of the sleeve 100 and clamp 84 assemblies are used. When a pair of the sleeve 100 and clamp 84 assemblies are used, one sleeve 100 and clamp 84 assembly of the pair of the sleeve 100 and clamp 84 assemblies are connected around the left lateral side bar 72, and the other sleeve 100 and clamp 84 assembly of the pair of the sleeve 100 and clamp 84 assemblies are connected around the right lateral side bar 74. The cross-bar 78 extends between the left lateral side bar 72 and the right lateral side bar 74 and is attached thereto. The accessory 80 is attached to the cross-bar 78 using the brackets 82.

One implementation of a method for installing the assembly described above comprises, on each of the left and right lateral side bars 72, 74, loosely connecting the two half portions 86a, 86b of the clamp 84 around the left lateral side bar 72 using the screws 89. As the clamp 84 is attached to the cross-bar 78, this also mounts the cross-bar 78 to the left lateral side bar 72.

The first and second longitudinal portions 116, 118 of the sleeve 100 are fitted around the left lateral side bar 72 and connected together using the pins 128, 132 and corresponding openings 130, 134 on abutting walls 120, 124. This is repeated on the right lateral side bar 74. The sleeve 100 is slid along the left lateral side bar 72 until it is received in the cylindrical passage 90 of the clamp 84. Similarly, the sleeve 100 on the right lateral side bar 74 is slid along the right lateral side bar 74 until it is received in the cylindrical passage 90 of the clamp 84 which is positioned on the right lateral side bar. The lips 142 of the sleeves are positioned in the grooves 98 of the clamps 84.

The sleeves 100 are rotated until any slack present between the left lateral side bar 72 and the right lateral side bar 74 is filled by the respective sleeves 100 due to the eccentricity of the thickness. The screws 89 of the clamps 84 are then tightened. If required, once the clamp-and-sleeve assembly is assembled, modifications can be made by rotating the sleeve 100 in situ, by means of inserting a tool (not shown) in one or more of the notches 144 in the lips 142 of the sleeves 100 and rotating the sleeves within the clamps 84. If required, the screws 89 of the clamps 84 are loosened to enable the rotation. The clamps 84 can be moved upwardly to provide grip on the sleeves 100. They can then be rotated by hand.

As seen in FIG. 14A, when the pair of sleeves 100, the pair of clamps 84 and the cross-bar 78 assembly are connected to the left and right lateral side bars 72, 74 of the roll cage 30, a distance 146 between the inner cylindrical axes 113 of the sleeves 100 on the left and right lateral side bars 72, 74, respectively, is a fixed distance. Rotation of one or both of the sleeves 100 within the clamps 74 can vary a distance 148 between the outer cylindrical axes 115 of the pairs of sleeves 100 on the left and right lateral side bars 72, 74, respectively. This can accommodate differences in distance between the left and right lateral side bars 72, 74 relative to the fixed distance between the ends of the cross-bar 78.

In the embodiment of FIG. 14A, the portion 110 with the maximum thickness 108a of the sleeve 100 on the left lateral side bar 72 is facing towards the portion 110 with the maximum thickness 108a of the sleeve 100 on the right lateral side bar 74.

In the embodiment of FIG. 14B, the sleeves 100 are rotated about a quarter turn in an anticlockwise direction compared to the position of the sleeves 100 of the embodiment of FIG. 14A, such that the maximum thickness 108a of the sleeve 100 on the left lateral side bar 72 is facing in substantially the same direction as the portion 110 with the maximum thickness 108a of the sleeve 100 on the right lateral side bar 74. A distance 148' between the outer cylindrical axes 115 of the pair of sleeves 100 on the left and right lateral side bars 72, 74, connected to the cross-bar 78, is greater than the distance 148 in the embodiment of FIG. 14A. This is to accommodate for a smaller distance between the left and right lateral side bars 72, 74 compared to the embodiment of FIG. 14A.

In the embodiment of FIG. 14C, the sleeves 100 are rotated about a half turn in an anticlockwise direction compared to the position of the sleeves 100 of the embodiment of FIG. 14A, such that the portion 110 with the maximum thickness 108a of the sleeve 100 on the left lateral side bar 72 is facing away from the portion 110 with the maximum thickness 108a of the sleeve 100 on the right lateral side bar 74. Consequently, a distance 148" between the outer cylindrical axes 115 of the pair of sleeves 100 on the left and right lateral side bars 72, 74, connected to the cross-bar 78, is greater than the distance 146 between the inner cylindrical axes 113 of the pair of sleeves 100 on the left and right lateral side bars 72, 74. Also the distance 148" is greater than the distance 148' of the embodiment of FIG. 14B, and greater than the distance 148 of the embodiment of FIG. 14A. In the embodiment of FIG. 14C, the sleeve 100 configuration is arranged to accommodate a smaller distance between the left and right lateral side bars 72, 74 compared to the embodiments of FIGS. 14A and 14B. In this embodiment, the distance 148" is less than the distance between the ends of the cross-bar 78.

It should be noted that the distance 146 between the inner cylindrical axis 113 of the pair of sleeves 100 does not change, as the position of this axis 113 for each sleeve 100 is fixed in relation to the cross-bar 78 once the sleeve 100, clamp 84 and cross-bar 78 are assembled. In other implementations (not shown), the pair of sleeves 100 can be positioned in any other relative rotational disposition in order to accommodate for the distance between the left and right lateral side bars 72, 74.

Accordingly, the positions of the sleeves 100 can be modified to accommodate variations in the distance between the left and right lateral side bars 72, 74 to which the cross-bar 78 is to be attached that may result from the manufacturing of the roll cage 30. Variations of distance 148 resulting from manufacturing of the cross-bar 78 may also be accommodated in this manner.

Modifications and improvements to the above-described implementations of the present invention may become apparent to those skilled in the art. The foregoing description is intended to be exemplary rather than limiting. The scope of the present invention is therefore intended to be limited solely by the scope of the appended claims.

The invention claimed is:

1. A vehicle accessory mounting kit comprising:
   an accessory mounting member for mounting a vehicle accessory thereto;
   a vehicle accessory connector for connecting the accessory mounting member to a tubular frame of a vehicle; and
   a sleeve for insertion into a cylindrical passage defined in the vehicle accessory connector, the sleeve comprising:
      a tubular body having a first open end, a second open end and a body thickness, the body thickness being circumferentially eccentric, the tubular body comprising two connectable portions; and
      an open ended slot defined in the tubular body, the open ended slot extending from the first open end towards the second open end and being spaced from the second open end.

2. The vehicle accessory mounting kit of claim 1, wherein the body thickness of the tubular body of the sleeve decreases circumferentially in a uniform manner from a maximum thickness to a minimum thickness, a portion of the tubular body with the maximum thickness being opposite another portion of the tubular body with the minimum thickness.

3. The vehicle accessory mounting kit of claim 1, wherein the open ended slot extends from the first open end past a centre of the tubular body, the centre being midway between the first open end and the second open end of the tubular body.

4. The vehicle accessory mounting kit of claim 1, wherein the two connectable portions comprise two longitudinal portions which are connectable to form the tubular body.

5. The vehicle accessory mounting kit of claim 4, wherein the two longitudinal portions are two half portions comprising abutting walls, and further comprising a sleeve connector acting between the abutting walls to connect the two longitudinal portions together.

6. The vehicle accessory mounting kit of claim 1, wherein the open ended slot comprises a plurality of open ended slots defined in the tubular body and circumferentially spaced apart from one another, at least one of the plurality of open ended slots extending from the first open end towards the second open end and being spaced from the second open end, and at least one of the plurality of open ended slots extending from the second open end towards the first open end and being spaced from the first open end.

7. The vehicle accessory mounting kit of claim 1, wherein the open ended slot is substantially parallel to a cylindrical axis of the tubular body.

8. The vehicle accessory mounting kit of claim 1, wherein the tubular body defines an inner cylindrical surface having an inner cylindrical axis, and an outer cylindrical surface having an outer cylindrical axis, the inner and outer cylindrical axes being off-set.

9. The vehicle accessory mounting kit of claim 1, wherein the vehicle accessory connector is a clamp comprising a clamp body defining the cylindrical passage for receiving the sleeve and two open ends for allowing the tubular frame of the vehicle to extend therethrough, the clamp body defining a recess in an external surface for receiving the accessory mounting member.

* * * * *